June 12, 1934.     S. B. WINN     1,962,266
SEMITRAILER
Filed July 27, 1932     2 Sheets-Sheet 2
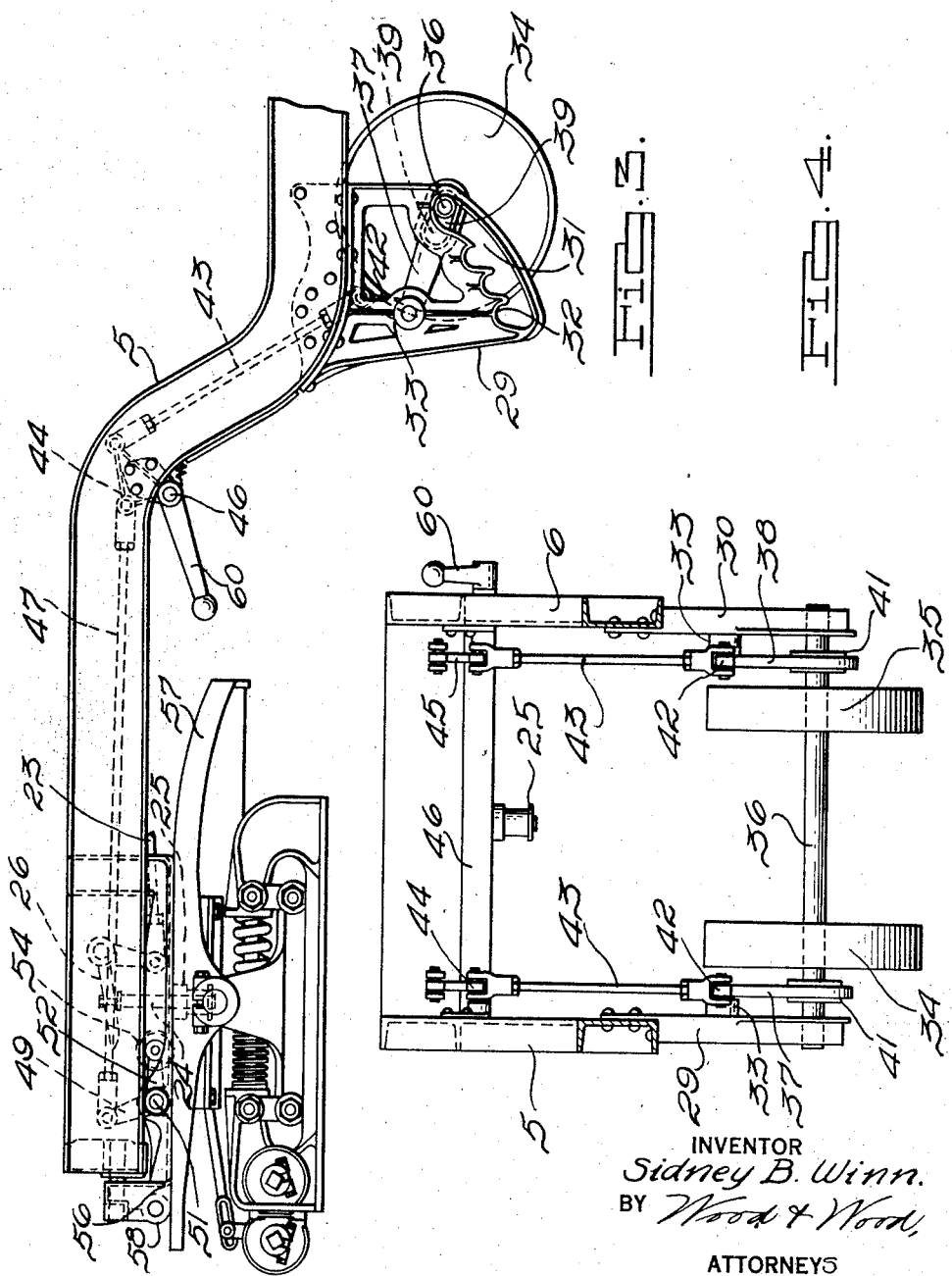
INVENTOR
Sidney B. Winn.
BY Wood & Wood,
ATTORNEYS Patented June 12, 1934

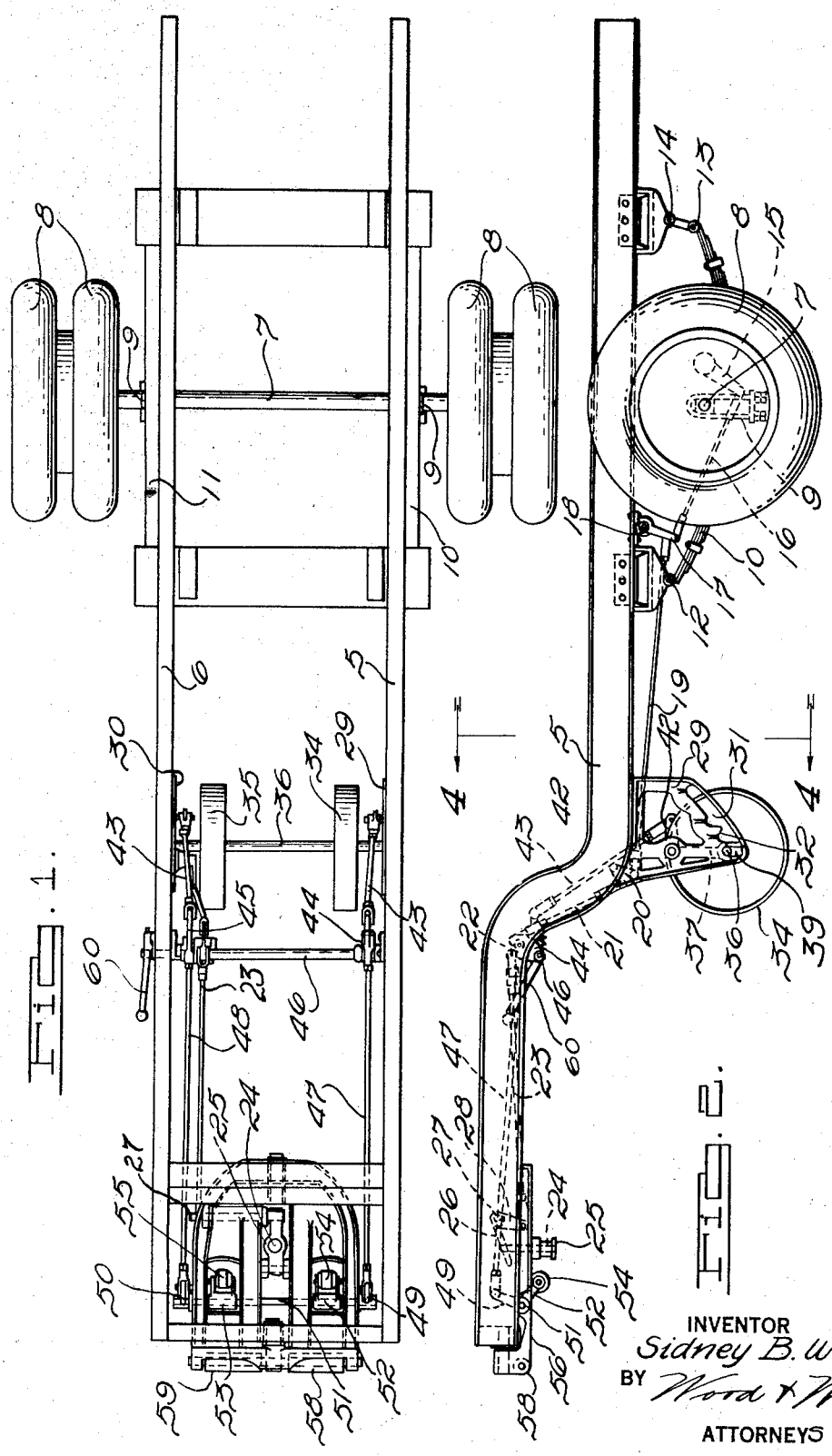

1,962,266

UNITED STATES PATENT OFFICE 1,962,266

SEMITRAILER

Sidney B. Winn, Lapeer, Mich.

Application July 27, 1932, Serial No. 625,014

13 Claims. (Cl. 280—33.1)

My invention relates to improvements in semi-trailers and particularly to a forward supporting mechanism and means for elevating the forward supporting mechanism.

In semi-trailer vehicles and particularly in such vehicles in which a drop frame is employed, the forward support is secured to the frame at the forward end of the lowest portion of the frame. When the trailer vehicle is coupled to the tractor and the vehicles are operated as a unit, this support is swung up and away from contact with the road. When the vehicles are uncoupled, the support is dropped to a position to provide a support for the forward end of the trailer.

Various types of fifth wheel coupling mechanisms are used with vehicles of this type. Such couplings are divisible couplings consisting of an upper portion carried by the trailer and a lower portion carried by the tractor. One form of these couplings consists of an oscillating type fifth wheel member carried on the tractor and includes a rocking plate member carrying the coupler, which is secured to the tractor, and a depending king pin carried by a plate secured to the trailer. Where a fifth wheel coupling of this type is used with a trailer of the drop frame type, it has been difficult heretofore to provide means for automatically raising the forward support of the trailer when the tractor and trailer are coupled. This has been due to the type of supports used and to the lack of space to permit of sufficient movement of the elevating mechanism to raise the support.

It is, therefore, an object of my present invention to provide a support for the forward end of a semi-trailer and means for elevating such support, said support and said means being particularly adapted for use with a semi-trailer of the drop frame type, the support being automatically elevated upon the coupling of the vehicles.

This, and various other objects, features of arrangement, construction and operation, are plainly shown and described and will be best understood by reference to the accompanying drawings wherein I have shown a preferred embodiment of my invention, in which:

Fig. 1 is a top plan view of a semi-trailer embodying my invention;

Fig. 2 is a side elevation of the semi-trailer shown in Fig. 1;

Fig. 3 is a fragmentary side elevation of a semi-trailer with the support in the raised position, the trailer being shown coupled to the lower portion of a fifth wheel secured to the tractor (not shown);

Fig. 4 is a sectional view taken on the line 4—4 of Fig. 2.

Similar reference numerals refer to similar parts throughout the several views.

A semi-trailer embodying my invention is constructed with a frame having parallel side sills 5 and 6. Near the rear end of the side sills 5 and 6 a rear axle 7, having a plurality of wheels 8, is secured in any desired manner, a conventional method here shown being the use of a plurality of axle clips 9 connecting the rear springs 10 and 11 with the axle 7. The rear springs 10 and 11 are secured to the side sills 5 and 6 by a plurality of shackles 12, 13 and 14.

It is to be understood that in a vehicle embodying my invention the wheels 8 may be fitted with any of the conventional braking mechanisms, which may be operated from the tractor in the conventional manner. Such a mechanism may include a plurality of brake drums secured to the rear wheels 8, and brake linkage such as the arm 15, the rod 16, and the lever 17, operatively connected to the brake operating cross shaft 18. The brake operating cross shaft 18 is operatively connected with the rod 19, which in turn is operatively connected with one arm of a bell crank 20, to the other arm of which a rod 21 is attached. At its other end the rod 21 is attached to an arm of another bell crank 22, the other arm of which is attached to the rod 23.

Movement of the rod 23 actuates or releases the brakes and is caused by movement of a brake operating pin 24 moving in the depending king pin 25, this movement of the brake operating pin 24 being transmitted to the brake operating finger 26 secured to a cross shaft 27, having an arm 28 connected with the rod 23.

In the embodiment shown, the side sills 5 and 6 are of the drop frame type, the ends adjacent the point of connection with the tractor being a greater height from the ground than the rear of the frame, the difference in height being accommodated by a stepped portion in which a single step of suitable extent is provided to accommodate the difference in the heighths of the frame. Adjacent these portions, on the sill 5, a bracket 29 is secured, and on the sill 6, a bracket 30 is secured. These brackets are each formed with a track portion 31 and a plurality of notches 32. As shown in Fig. 4, each of these brackets is provided with an extending portion 33 forming an abutment acting to support a portion of the elevating mechanism.

The supporting mechanism consists of two wheels 34 and 35 carried on an axle 36, the axle 36 extending at each end beyond the outer faces of the wheels 34 and 35 and into the track portions 31 of each of the brackets 29 and 30. Midway between the outer faces of the wheels 34 and 35 and the brackets 29 and 30, the axle 36 passes through members 37 and 38, each of which is formed with an elongated slot 39 (Fig. 3) at the lower ends of each of the members. At the other end of each of the members 37 and 38, the members are pivotally mounted on the portions 33 of the brackets 29 and 30. In order to prevent end play of the axle 36 and its possible dislocation from the tracks 31 in the members 29 and 30, flanged collars 41 are secured to the axle 36 at the point where the axle passes through the elongated slots 39 in the members 37 and 38.

Each of the members 37 and 38 has an extending arm 42 adjacent the point of pivotal connection with the portion 33 of the brackets 29 and 30. The arms 42 and the members 37 and 38 form a bell crank, in one arm of which the axle 36 is held, and the other arm of which is pivotally connected with operating rods 43.

Bell cranks 44 and 45 are secured to a cross shaft 46 and rock with it. One arm of each of the bell cranks 44 and 45 is pivotally connected with an operating rod 43. The other arm of the bell crank 44 is pivotally connected with an operating rod 47, and the other arm of the bell crank 45 is pivotally connected with an operating rod 48. The other end of the operating rod 47 is pivotally connected with an arm 49 and the other end of the operating rod 48 is pivotally connected with an arm 50. Each of the arms 49 and 50 is secured to a rocking cross shaft 51.

Bracketed arms 52 and 53, carrying rollers 54 and 55, are also secured to the shaft 51. The bracketed arms 52 and 53, and the rollers 54 and 55, extend below the surface of the upper fifth wheel plate 56, as shown in Fig. 2, when the vehicles are uncoupled, and contact with the top 57 of the lower fifth wheel plate (Fig. 3) and are held in place when the vehicles are coupled. To facilitate the ready coupling of the vehicles, rollers 58 and 59 are provided in the forward portion of the trailer fifth wheel plate 56.

Operatively connected with the cross shaft 46 is an operating handle 60 to permit the manual rotation of the cross shaft 46 to lower the axle 36 and the supporting wheels 34 and 35 to the supporting position.

The operation of a device embodying my invention is as follows:

When the tractor and trailer are uncoupled, the forward trailer support is in the lowered position, as shown in Fig. 2. At this time the rollers 54 and 55 in the bracketed arms 52 and 53 drop to a point below the lower face of the trailer fifth wheel plate 56. Upon coupling of a tractor to the trailer, the upper plate 57 of the tractor fifth wheel is pushed under the forward end of the trailer. The forward rollers 58 and 59 contact with the face of the plate 57 and roll upon it. The rollers 54 and 55 then contact with this plate 57 and as they roll on to the plate 57 the weight of the trailer and its load causes these rollers to be pushed upward. This movement is transmitted through the bracketed arms 52 and 53 and causes a rotation of the shaft 51 in a counter-clockwise direction. This moves the arms 49 and 50 and exerts a pull on the rods 47 and 48, which causes a counter-clockwise rotation of the shaft 46. This is transmitted through the bell cranks 44 and 45 to the rods 43, which exerts a pull on the rods and on the arms 42 on the members 37 and 38. This causes the members 37 and 38 to swing about the pivot points and occupy the position shown in Fig. 3.

At this time the axle 36 is carried to the upper end of the track 31 in the brackets 29 and 30. This raises the support to a sufficient extent so that the lowest points on the rims of the wheels 34 and 35 are on a line with the lowest points of the brackets 29 and 30. When these wheels occupy this position, the support is said to be in the raised position.

When the vehicles are uncoupled, the operator operates the crank 60, which rotates the shaft 46 and causes the wheels 34 and 35 and the axle 36 to move in the downward direction and assume the position shown in Fig. 2. As the wheels 34 and 35 are held from further downward movement by contact of the supporting medium with the ground, the weight of the trailer and its load is exerting a force in a downward direction on the brackets 29 and 30 and one of the notches 32 contacts with the axle 36 and acts to hold the entire support in that position and to furnish a complete support for the trailer even though the wheels may not have reached the end of the downward movement.

The notched portions 32 of the brackets 29 and 30 are of a suitable size and shape to receive the axle 36 and hold it whenever the wheels 34 and 35 contact with a supporting medium. This provides a support for the forward end of the trailer even though the wheels 34 and 35 are prevented from moving the full extent in a downward direction. When the wheels 34 and 35 contact with a supporting medium, further downward movement is prevented and the weight of the trailer and its load bears downwardly through the brackets 29 and 30 and causes one of the notches 32 to contact with the axle 36 and hold it against displacement until this weight is removed therefrom.

While I have illustrated and described one embodiment of my invention, it is apparent that various changes and modifications may be made without departing from the spirit of my invention, and I do not wish to be limited to the precise details of construction as herein set forth, but desire to avail myself of all changes within the scope of the appended claims.

Having thus described my invention, what I claim is new and desire to secure by Letters Patent of the United States is:

1. Supporting means for a semi-trailer vehicle, including, a trailer frame having side sills, an axle, a plurality of supporting wheels journaled on said axle, a plurality of brackets secured to the side sills of said trailer frame and adapted to receive the ends of said axle, and means for moving said axle relative to said brackets.

2. Supporting means for a semi-trailer vehicle, including, a trailer frame having side sills, an axle, a plurality of supporting wheels journaled thereon, a plurality of axle supporting brackets secured to the side sills of the trailer frame, each of said brackets having an enclosed track portion contacting with the ends of said axle, and means for swinging said axle to upper position within said enclosed track portion of said brackets.

3. Supporting means for a semi-trailer vehicle, including, a trailer frame having side sills, an axle, a plurality of supporting wheels journaled thereon, a plurality of axle supporting brackets secured to the side sills of the trailer frame, each of said brackets having an enclosed track portion adapted to contact with the ends of said axle, and a plurality of notches extending within said enclosed track portion, and means for moving said axle relative to said brackets.

4. Supporting means for a semi-trailer vehicle, including, a trailer frame having side sills, an axle, a plurality of supporting wheels journaled on said axle, a plurality of brackets secured to the side sills of a trailer frame and adapted to receive the ends of said axle, and means for moving said axle within said brackets, and including means pivotally mounted adjacent each of said brackets and adapted to contact with said axle.

5. Supporting means for a semi-trailer vehicle, including, a trailer frame having side sills, an axle, a plurality of supporting wheels journaled on said axle, a plurality of brackets secured to the side sills of said trailer frame and adapted to receive the ends of said axle, means for moving said axle within said brackets, and including pivotally mounted means contacting with said axle, and means operatively connected with said pivotally mounted means for moving said pivotally mounted means and including a cross rod and an operating crank secured thereto.

6. Supporting means for a semi-trailer vehicle, including, a trailer frame including side sills, comprising an axle, a plurality of supporting wheels journaled on said axle, a plurality of brackets secured to the side sills of said trailer frame and adapted to receive the ends of said axle, means for moving said axle relative to said brackets including pivotally mounted means contacting with said axle, means operatively connecting said pivotally mounted means with an operating cross shaft, a plurality of rollers journaled in brackets secured to said operating cross shaft, and means operatively connecting said operating cross shaft and said pivotally mounted means whereby movement of said cross shaft is transmitted to said pivotally mounted means to cause a movement of said axle.

7. Supporting means for a semi-trailer vehicle, including, a trailer frame including side sills, comprising an axle, a plurality of supporting wheels journaled on said axle, a plurality of brackets secured to the side sills of said trailer frame and adapted to receive the ends of said axle, and means for moving said axle relative to said brackets, and including pivotally mounted means contacting with said axle, said pivotally mounted means being connected with manually operated means including a rocking cross shaft and a crank secured thereto and with means adapted to be contacted by a portion of the tractor vehicle and including a plurality of rollers journaled in brackets secured to an operating cross shaft, and means operatively connecting said operating cross shaft and said pivotally mounted means whereby movement of said cross shaft is transmitted to said pivotally mounted means for movement of said axle.

8. Trailer support elevating means including a plurality of fixed brackets, and an axle journaled in said brackets, and means including a train of levers operatively connected to means contacting with said axle, and means for moving said levers, and means contacting with said levers for moving said axle relative to said brackets and including a manually operated cross shaft.

9. Trailer support elevating means including a plurality of fixed brackets, and an axle journaled in said brackets, and means including a train of levers operatively connected to means contacting with said axle, means for moving said levers, and operating means connected with said levers and including a plurality of depending rollers secured to a cross shaft and adapted to contact with a part of a tractor when the tractor is coupled to the trailer.

10. Trailer support elevating means including a plurality of fixed brackets, and an axle journaled in said brackets, means including a train of levers operatively connected to means contacting with said axle, and means for moving said levers, and operating means connected with said levers and including a manually operated cross shaft, a plurality of depending rollers secured to a second cross shaft, said first cross shaft and said second cross shaft being operatively connected by a train of levers, with means contacting with said axle, said depending rollers being adapted to contact with a part of a tractor when the tractor is coupled to a trailer, and to initiate a movement in said train of levers.

11. Supporting means for a semi-trailer vehicle including a trailer frame having side sills, comprising: an axle, a plurality of supporting wheels journalled on said axle, a plurality of brackets secured to the side sills of said trailer frame and adapted to receive the ends of said axle, means for moving said axle relative to said brackets including pivotally mounted means contacting with said axle, means for moving said pivotally mounted means including a manually operated cross rod and a crank secured thereto, means operatively connecting said pivotally mounted means with said means for moving said pivotally mounted means, and automatic means connected with said means operatively connecting said pivotally mounted means and adapted to be operated by contact with the rear portion of a tractor vehicle.

12. In a tractor trailer combination including a trailer support and coupling at the end of the tractor and the adjacent end of the trailer adapted for cooperation with said support and including a coupler cooperating with said tractor coupling; a prop for supporting the coupling end of the trailer when in uncoupled position including a cross rod and pivotally mounted arms carrying said rod, brackets fixed to the trailer frame, said brackets including upwardly and rearwardly extending grooves therein, said rod having its ends engaged in said grooves, and devices including swinging arms adapted to engage the rear end of the tractor when the trailer is coupled thereto, each of said devices having one of its swinging arms operatively connected to a support arm of the prop for swinging the prop upwardly in said grooves.

13. In a tractor trailer combination including a trailer support and a coupler at the rear end of the tractor and the adjacent end of the trailer having a coupler cooperating with the coupler of the tractor and adapted for cooperation with said support; a prop for supporting the coupling end of the trailer when in uncoupled position including an axle, wheels on the axle and pivotally mounted arms carrying said axle, brackets fixed to the trailer frame and pivotally supporting said axle carrying arms, said brackets including grooves therein formed on a radius described from the center of the pivotal supports, said axle having its ends engaged in said grooves, and a device including swinging arms adapted to engage the rear end of the tractor when the trailer is coupled thereto, said device having one of its swinging arms operatively connected to the support arms of the prop for swinging the prop upwardly in said grooves.

SIDNEY B. WINN.